No. 679,587. Patented July 30, 1901.
J. ZELLWEGER.
APPARATUS FOR COLLECTING GASES, VAPORS, AND FOREIGN PARTICLES FROM AIR.
(Application filed Sept. 26, 1899.)
(No Model.)
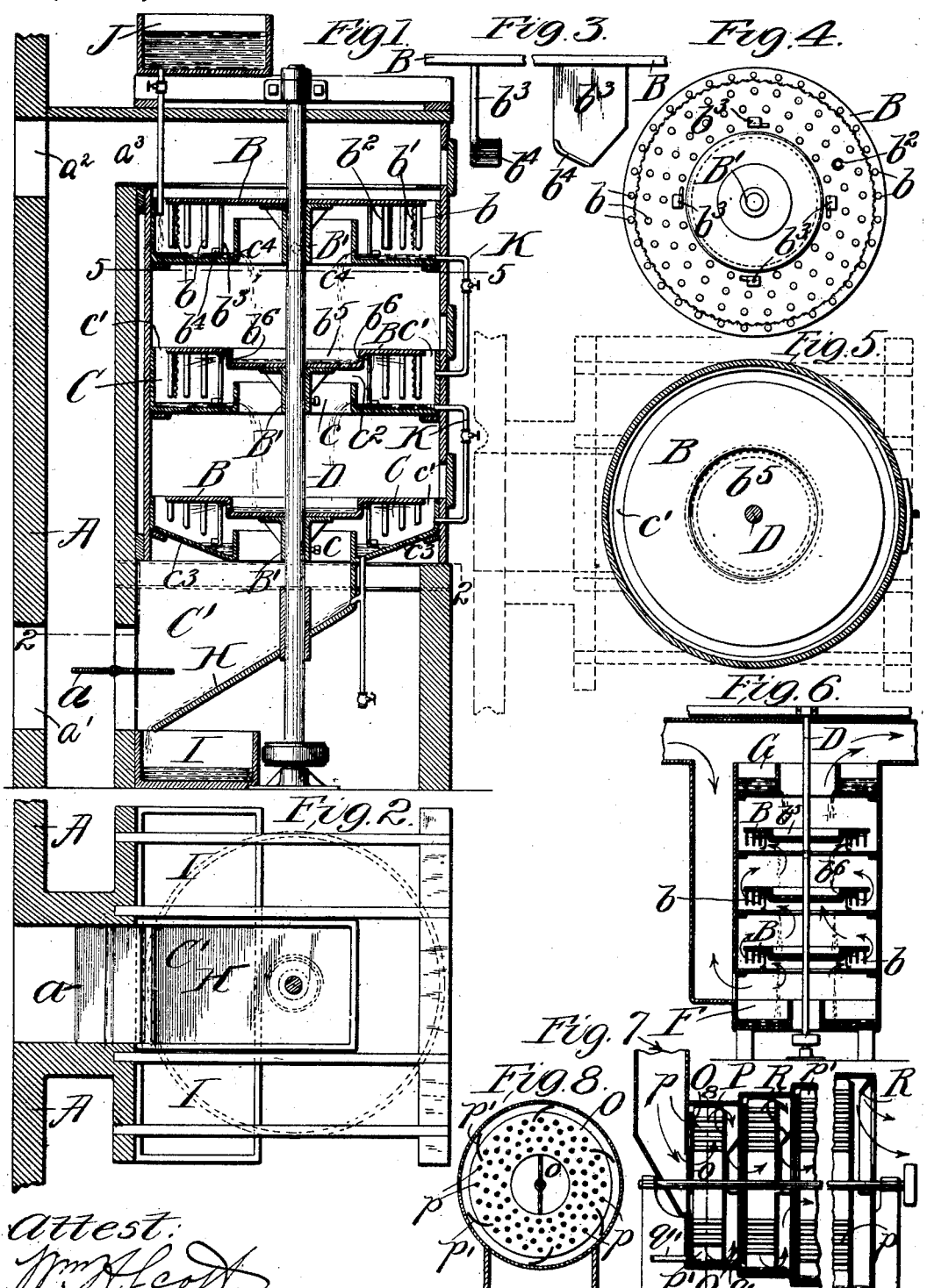

UNITED STATES PATENT OFFICE.

JOHN ZELLWEGER, OF ST. LOUIS, MISSOURI.

APPARATUS FOR COLLECTING GASES, VAPORS, AND FOREIGN PARTICLES FROM AIR.

SPECIFICATION forming part of Letters Patent No. 679,587, dated July 30, 1901.

Application filed September 26, 1899. Serial No. 731,727. (No model.)

*To all whom it may concern:*

Be it known that I, JOHN ZELLWEGER, a citizen of the United States, residing at the city of St. Louis, State of Missouri, have invented a certain new and useful Improvement in Apparatus for Collecting Gases, Vapors, and Foreign Particles, such as Dust, &c., from Air, of which the following is a full, clear, and exact description, such as will enable others skilled in the art to which it appertains to make and use the same, reference being had to the accompanying drawings, forming part of this specification, in which—

Figure 1 is a vertical sectional view through my improved apparatus. Fig. 2 is a horizontal sectional view on line 2 2, Fig. 1. Fig. 3 is an edge and side elevational view of one of the flanged vanelets employed in the apparatus. Fig. 4 is an inverted plan view of one of the fan-disks. Fig. 5 is a cross-sectional view on line 5 5, Fig. 1. Fig. 6 is a vertical sectional view of a slightly-modified form of apparatus. Fig. 7 is a vertical sectional view through another modified form of apparatus; and Fig. 8 is a sectional view on line 8 8, Fig. 7.

This invention relates to a new and useful improvement in machines which are used for the collection of gases, vapors, and fine dust from air, the objects being to provide an effective apparatus for the collection of gases, vapors, and fine dust where they are widely diffused in large volumes of air; also, to provide an apparatus which will facilitate and accelerate the commingling of gases, vapors, and dust with liquids.

With these objects in view the invention consists in the construction, arrangement, and combination of the several parts, all as will hereinafter be described and afterward pointed out in the claims.

In the drawings I have shown my apparatus for the collection of gases, vapors, and fine dust from air as applied to a stack A, through which products of combustion escape, they entering at $a'$ and passing out at $a^2$ in ordinary operation. A suitable damper $a$ is employed at the inlet-opening of my improved apparatus, which when the device is in operation offers a by-pass for the products of combustion through the apparatus, but permits the ordinary operation of the stack when the apparatus is idle. If desired, a similar damper (not shown) may be employed at the outlet-opening $a^3$, leading from the apparatus. Damper $a$ is hinged above its center, so that it will automatically open when the apparatus is in operation and induce circulation therethrough. When the apparatus is at rest, the damper $a$ closes and permits the products of combustion to pass uninterruptedly through the openings $a'$ and $a^2$. When the apparatus is in operation, the products of combustion are drawn directly from the opening $a'$, past the damper $a$, into the apparatus, through which they are forced, escaping through the opening $a^3$ and out through the stack-opening $a^2$. I do not wish to be understood, however, as confining the use of my invention to the collection of gases, vapors, fine dust, &c., from products of combustion, as there are other uses to which the same can be applied without in the least departing from the nature and principle of my invention.

Gases, vapors, dust, soot, &c., produced in many industrial operations — such as the burning of coal, the crushing, roasting, and reduction of zinc ore, &c.—at present are usually allowed to escape into the open air, where they are not only objectionable, but often injurious to animal and plant life, besides representing a pecuniary loss. For the purpose of collecting these gases, vapors, and burned particles in the form of dust, &c., when in a diluted condition I have constructed a precipitating-machine, which consists of a fan-wheel B, arranged in a fan-chamber C, provided with air inlet and outlet openings $c$ and $c'$, arranged centrally and circumferentially, respectively, and containing a body of liquid in the lower portion thereof. The fan-wheel when at rest dips with some of its vanes $b$ into this body of liquid, as shown in the drawings, said fan when set in rapid motion not only producing a current of air through the apparatus, but also dashing the liquid from the bottom of the fan-chamber against the outer walls thereof, thereby continually wetting and washing them down. The liquid adhering to the rapidly-moving vanes will come in forcible contact with the gases, vapors, and foreign particles, such as dust, &c., which are being carried through the apparatus by the current of air and will arrest and retain them either by absorption, adhesion, or chemical combination. For merely collecting gases, vapors, dust, &c., I use water for wetting the fan-vanes; but where water alone will not absorb the gases I use a liquid which has a chemical affinity for the gas to be collected—for example, sulfurous-acid gas escaping from roasting-furnaces may be collected by the use of soda or lime dissolved in water to obtain sulfites of soda or of lime. If nitric acid is used, the sulfurous-acid gas will be oxidized into sulfuric acid. The chemical combinations here mentioned are greatly facilitated by the mingling action of the vanes, and especially their impact against the gases, vapors, &c., in the air. Where a wire-netting $b'$ is used, this also assists in the commingling of the gases, &c., with the liquid.

The preferred form of fan-wheel is that illustrated in the drawings, wherein a circular disk is mounted on a shaft D and provided on one of its sides with numerous small vanes or "vanelets" $b$, as they might be called, all arranged in an annular zone near the circumference of the disk. These vanelets may be perforated plates, wire-netting, or wooden lattice-work set at an angle to the disk, but are preferably made in the form of round pins or studs of wood. The fan-chambers, fan-disk, and vanelets may or may not be covered by a coating of material—such as lead, glass, enamel, burnt clay, or rubber—as shown at $b^2$, to better withstand the action of the liquid used. Some of the vanelets, as $b^3$, preferably those nearest the center of the disk, are made in the form of plates placed tangentially to their paths of rotation and are bent, twisted, or provided with suitable means on their outer ends to form flanges $b^4$, practically parallel to the disk and radiating from the axis thereof, but slightly diverging from the disk in the direction of rotation to serve as scoops for the liquid in the bottom of the chamber in which they operate. The forward edges of these flanged vanelets are made to recede from the direction of rotation, as shown in Fig. 3.

The preferred form of fan-chamber is an annular trough C, open at its top and provided with an opening $c$ through its center, through which the disk shaft D passes and through which the dust or vapor laden air is induced to circulate. The outer diameter of this trough is greater than that of the fan-wheel, so as to leave an annular space $c'$ around the disk, through which the purified air can escape. The inner wall or flange of the trough has a diameter smaller than the inner diameter of the zone of vanelets on the fan-wheel and has its upper edge located some distance below the fan-disk B, so as to leave a space or passage $c^2$, through which the air passes from the inlet-opening $c$ to the fan-chamber. The bottom of the trough forming the fan-chamber is made water-tight and covered by a body of liquid, usually water; but neutral alkaline or acid liquid, depending upon the nature of the gases, vapors, or dust to be collected, may be used.

The top of the fan-chamber is formed by the fan wheel or disk, which has its vanelets projecting downwardly into the trough, but terminating short of the bottom thereof to avoid friction. Where the bottom of the trough is inclined, as shown at $c^3$, Fig. 1, the vanelets are of varying length to accord with this inclination, the longest of the vanelets being preferably those nearest the axis of rotation and which are provided with the flanges $b^3$, designed to dip into the body of the liquid. When the fan-wheel is revolved rapidly, the inclined flanges on the long plates or vanelets $b^2$ will act as scoops to lift up some of the liquid and dash or throw it toward the disk B, thereby wetting and washing down all of the rapidly-moving vanelets. Centrifugal action acts on the liquid when it strikes the disk and the vanelets, with the result that such action assists in inducing a current of air through the fan-chamber, which current of air is cut by the rapidly-moving vanelets, so as to thoroughly commingle the foreign particles in the air with the liquid in the fan-chamber. The revolving fan sets the air in the fan-chamber in circular motion, and the centrifugal force produced forces the air out of the fan-chamber through the annular opening $c'$ at the circumference of the disk, while atmospheric pressure fills the space with other air entering through the central opening $c$ and passing through the space $c^2$. This central opening is connected by means of a suitable conduit or passage C' with the space from where the gases or dust has to be collected, which is shown in Fig. 1 as the stack A to illustrate the application of the invention to the stack, and which stack is in communication with the atmosphere. The revolving fan produces a partial vacuum in the conduit and induces a current of air to pass through it and the fan-chamber, raising the gravitating-damper $a$ by this action. This current of air will deposit its gases, vapors, or dust particles on the wet and adhesive surfaces of the fan wheel or disk, its vanelets, and the fan-chamber, finally escaping in a purified condition into the open air. The liquid on the surface of the fan wheel or disk and the interior of the fan-chamber is continually replaced by a fresh supply, and by this means the adhesiveness of those surfaces is continually renewed.

In Fig. 1 I have shown a plurality of precipitators for the purpose of increasing the efficiency of the apparatus, said precipitators being arranged one above the other and centrally with relation to the machine, while in Fig. 7 I have shown them side by side, the fan-disks being mounted on a horizontally-disposed shaft. Where a plurality of fan-disks are arranged either one above the other or side by side, the air escaping from the circumference of the first fan-chamber is drawn into and through the eye of the next succeeding fan-chamber, and so on, passing through the machine, being subjected to practically the same treatment in its passage through the several fan-chambers, finally escaping to the open air. Where a plurality of disks are employed, I prefer to use a shaft common to all of said disks, said disks being supported by collars or hubs B', secured to the disks and clamped to the shaft by suitable set-screws, whereby the disks may be adjusted vertically or lifted to give access to its under surface in the event that repairs are necessary and also to clean the vanelets and remove accumulated sediment in the troughs.

Where the liquid used is apt to destroy the walls of the fan-chamber, I surround the several walls of the fan-chamber by a common casing and support said chambers in their horizontal position by suitable lugs, bolts, or other securing means extending through or from the casing. In the machine shown in Fig. 1 each precipitator or fan-disk has its own trough, and the liquid in it can be retained therein until it contains a certain percentage of the collected gases, vapors, or dust particles, when it can be tapped into the trough of a precipitator below, as by means of the pipes K, to be further enriched or removed from the machine entirely. The same operation of passing the liquid from one precipitator to another can be carried out for a horizontal machine by either placing the shaft horizontally and making the diameter of the successive fan-chambers larger or by making all of the fan-chambers of an equal diameter and placing their shaft-line slightly out of level. In cases where the concentration of the dissolving liquid is of no importance the inner walls of the troughs forming the fan-chambers of the vertical machine can be left out and the liquid allowed to trickle from the bottom of an upper precipitator onto the fan-disk below, as shown in Fig. 6. In this case each disk is provided on its upper side, near the center, with a receptacle $b^5$ for the dropping liquid. The diameter of this receptacle must be larger than that of the air-inlet opening of the upper fan-chamber and has in its bottom or outer wall one continuous slit or a number of openings $b^6$, leading to the under side of the fan-disk. The liquid then will pass through these openings and from there will be thrown by centrifugal force outwardly against the vanelets of the disks. The liquid then drops from the vanelets onto the bottom of this lower fan-chamber, flowing toward the central opening or air-inlet, and there drops into the receptacle of the lower fan-disk. In such a machine the fan-disks have no scoops to lift and scatter the liquid. The liquid in this case passes through the apparatus in a comparatively short time and may be collected at the bottom in a receiving-tank F, (see Fig. 6,) and from there may be pumped to the top of the apparatus into a feeding-tank G, from which it enters the machine again by dropping into the receptacle of the top fan-disk. If desired, the lower tank can be made large enough to serve as a settling-tank.

In the preferred form, (shown in Fig. 1,) in which the fan-chambers are constructed as troughs, there is danger of getting too much liquid into any one or more of these several troughs, which would interfere with the motion of the disks. This occurrence is avoided by providing the inner walls of the troughs with overflow-openings for discharging the excess liquid into the central receptacle $b^5$ on the upper surface of the fan-disk below, as heretofore described, whence said liquid is thrown from said receptacle against the vanelets on the under side of the fan through the openings $b^6$. From the bottom trough the liquid may be discharged onto an incline H to be delivered into a receiving-tank I, whence it may be pumped by a suitable apparatus into the delivering or feeding tank J for further enrichment. Pipes K are also provided as by-passes for conveying the liquid from the several troughs, if desired.

It will be obvious that my apparatus can be used for purifying air with or without the employment of a disinfectant and if hot water is employed may be used to heat the air for delivering it into buildings or rooms.

In Fig. 7 is shown a horizontal arrangement of fans in which two disks O and P are employed, the latter being solid, while the former is provided with an inlet eye or opening $o$ in its center. Vanelets $p$ are arranged between these blades, and between the peripheries thereof are scooping-blades $p'$, used for lifting the liquid in the bottom of the casing, so that it may fall on the vanelets. The successive fan-chambers have increasing diameters, and each fan-chamber is separated by a flange Q, extending from the casing and provided with a central opening registering with the eye of the fan-blade. These partitions form troughs for the retention of the liquid, while overflow-openings $q$ discharge the excess liquid into the next succeeding trough. A supply-pipe $q'$ for the liquid enters the first trough. Water-sheds R are employed in this construction extending from the casing or the partitions thereof for the purpose of confining the liquid in the fan-chamber from whose trough it was lifted. In all forms of my apparatus the dust or vapor laden air is compelled to travel a circuitous path and where a plurality of precipitators or fan-disks are used to be intimately associated with liquid either on the fan-disks, the vanelets extending from the fan, the walls of the fan-chamber, or the particles of liquid passing through the air.

I am aware that minor changes in the arrangement, construction, and combination of several parts of my device can be made and substituted for those herein shown and described without in the least departing from the nature and principle of my invention.

In this specification and claims where the term "zone of rotation" of the vanelets is employed it will be understood as meaning the path, field, or belt in which the vanelets during the rotation of the fan travel.

Having thus described my invention, what I claim, and desire to secure by Letters Patent, is—

1. The combination with a casing, of a fan-disk rotatably mounted therein, means for rotating the fan-disk, said fan-disk carrying a series of bodies projecting at an angle from the face thereof and serving as vanelets and forming continuous air-passages leading from the center to the circumference of said fan-disk, said passages communicating at both ends with the surrounding air, and means within the zone of rotation of said vanelets for introducing liquid into the zone of rotation of said vanelets, substantially as described.

2. The combination with a casing, of a fan-disk rotatably mounted therein, means for rotating the fan-disk, said fan-disk carrying a series of bodies projecting at an angle from the face thereof and serving as vanelets and forming continuous air-passages leading from the center to the circumference of the fan-disk, said passages communicating at both ends with the surrounding air, and means carried by the fan-disk for causing liquid to enter into the zone of rotation of said vanelets.

3. The combination with a casing provided with a plurality of fan-chambers communicating alternately at the center and the circumference thereof, of a fan-disk rotatably mounted in each fan-chamber, said fan-disk carrying a series of bodies projecting at an angle from the face thereof and serving as vanelets and forming continuous air-passages leading from the center to the circumference of the fan-disk, said passages communicating at both ends with the surrounding air, means for rotating said fan-disks, and means for causing liquid to enter into the zone of rotation of the vanelets on said disks, substantially as described.

4. The combination with a fan-casing, of a fan therein, means for rotating said fan to induce a current of gas through said casing, means in said casing for containing liquid in juxtaposition thereto, and means on said fan for scooping the liquid from said receptacle and projecting it against the working face or faces of said fan, substantially as described.

5. The combination with a fan-disk, and means for rotating the disk, of vanelets projecting therefrom, a receptacle containing a liquid, and scoops mounted on said disk for projecting the liquid in said receptacle against said vanelets, substantially as described.

6. A fan-disk provided with working faces extending at an angle to the disk and with a receptacle for liquid, said receptacle having an opening or openings at or near the periphery of the receptacle, whereby centrifugal force projects the liquid from said receptacle through said openings and against said working faces of the fan, substantially as described.

7. The combination of a fan-disk provided with a receptacle in its upper surface which communicates with the space beneath the disk by suitable openings at or near the periphery of the receptacle, and vanelets depending from the under surface of said fan-disk for receiving a liquid projected through said openings from said receptacle by centrifugal force, substantially as described.

8. The combination with a fan-disk, of a shaft on which said fan is mounted, means for imparting rotation to said shaft, an annular trough opposite said disk for containing liquid in juxtaposition thereto, said trough being provided with overflow-openings, substantially as described.

9. The combination with a casing, of a fan rotatively mounted therein, means for rotating said fan to cause the passage of a gas through said casing, and a trough containing a liquid in juxtaposition to said fan, and a part carried by the fan adjacent the inner periphery of its working face extending into the liquid in the trough and acting to throw the liquid into the zone of rotation of the working face of the fan, substantially as described.

10. The combination with a casing containing a plurality of fan-chambers, of a plurality of fans arranged in said chambers, a shaft on which said fans are mounted, means for imparting rotation to said shaft, liquid-containing receptacles in the bottoms of the several fan-chambers, and means for projecting the liquid in said receptacles against the working faces of the several fans respectively, substantially as described.

11. The combination with a casing, of a plurality of partition-walls for receiving the liquid, said partition-walls also forming fan-chambers, a centrally-arranged shaft, means for rotating said shaft, fan-disks on said shaft, vanelets on said disks and extending at an angle thereto, and receptacles in said disks for receiving a liquid from an adjacent partition-wall and discharging the same by centrifugal force against the vanelets, substantially as described.

12. The combination with a suitable casing, of a plurality of annular liquid-containing troughs arranged therein, a centrally-arranged shaft, fan-disks on said shaft, means for rotating said shaft, vanelets on said fan-disks, and scoops extending into the liquid in the troughs for projecting the liquid against the vanelets, substantially as described.

13. The combination with a casing, of a plurality of stationary troughs arranged therein, a plurality of fans coöperating with said troughs, a shaft on which the fans are mounted, means for rotating said shaft, means for projecting the liquid in the troughs against the working faces of their respective fans, and pipe connections leading to and from said troughs, substantially as described.

14. The combination with a casing, of removable troughs or partitions supported therein for receiving a liquid, fans arranged in juxtaposition thereto, a shaft on which the fans are mounted, means for rotating said shaft, and means for discharging the liquid against the working faces of said fans, substantially as described.

15. The combination with a fan-disk provided with working faces, of a screen attached to said disk, a shaft on which said disk is mounted, means for rotating said shaft, and means for discharging liquid onto said screen while the fan is in motion, substantially as described.

16. The combination with a casing having an inlet-opening at one end, an eccentrically-mounted damper for closing said opening, a plurality of fan-chambers in said casing, fans in said chambers, a shaft on which said disk is mounted, means for rotating said shaft, and means for wetting the working faces of said fans, substantially as described.

17. The combination with a fan-casing having a central inlet-opening, and a circumferential outlet-opening, of a fan in said casing, means for rotating the same to induce a current of gas through said casing, the fan-vanes arranged to pass through said current, and means carried by said fan for projecting a liquid against said fan-vanes, substantially as described.

18. The combination with a casing, of a fan rotatably mounted therein and having air-propelling faces, means for rotating said fan to cause the passage of the gas through said casing, and means carried by the fan within the zone of rotation of the air-propelling faces of the fan for projecting a liquid into the zone of rotation of the air-propelling faces of the said fan, substantially as described.

19. The combination with a casing, of a rotatable shaft arranged therein, means for rotating said shaft, a disk mounted on said shaft and provided with a series of projections serving as vanelets to positively move the air, means adjacent said vanelets for containing a liquid, and means arranged within the zone of rotation of said vanelets and extending into said liquid for projecting said liquid into the zone of rotation of said vanelets, where said liquid is intercepted and thrown outwardly by centrifugal force, substantially as described.

20. The combination with a casing forming a fan-chamber, of a rotatable shaft in said chamber, a disk mounted on said shaft, a system of bodies carried by the disk at or near its periphery and serving as vanelets, and forming between and around them continuous air-passages, which passages lead from the center of the disk to the circumference thereof, and means at or near the inner periphery of the zone of rotation of said vanelets for introducing liquid into said zone, whereby said liquid is thrown outwardly by centrifugal force by the vanelets with which it contacts, substantially as described.

In testimony whereof I hereunto affix my signature, in the presence of two witnesses, this 23d day of September, 1899.

JOHN ZELLWEGER.

Witnesses:
F. R. CORNWALL,
WM. H. SCOTT.